Patented May 11, 1948

2,441,163

UNITED STATES PATENT OFFICE 2,441,163

TREATMENT OF PINEAPPLE PLANTS WITH PLANT HORMONES

Ferdinand P. Mehrlich, Honolulu, Territory of Hawaii, assignor to Hawaiian Pineapple Company, Limited, a corporation of Hawaii No Drawing. Original application April 30, 1943, Serial No. 485,181. Divided and this application January 24, 1944, Serial No. 519,539

4 Claims. (Cl. 47—58)

This invention relates to the culture of pineapple plants and to methods for chemically controlling the growth thereof. More particularly, the invention concerns the application to pineapple plants of those synthetic organic compounds known as "plant hormones" which, under certain conditions of application, have a general growth stimulating effect on plants. As examples of such synthetic plant hormones may be mentioned naphthalene and indole compounds such as alpha naphthaleneacetic, beta naphthoxy acetic, indoleacetic and indolebutyric acids, and amides and alkali metal salts thereof.

An object of the invention is to provide novel methods of pineapple culture in which, by the utilization of such compounds, the size and weight of the pineapple fruit are substantially increased and its quality is improved. Another object is to provide such a method by which the time of differentiation and flowering and/or the date of maturation of the fruit may be changed as desired. As is well known, differentiation is the change of the plant from vegetative to flowering condition.

This application is a division of my copending application, Ser. No. 485,181, filed April 30, 1943, now Patent 2,428,335 in which treatment after differentiation of the plants is claimed.

In conventional pineapple culture, considerable difficulty may be experienced by the weakening of the peduncle (fruit stem) allowing the fruit to fall over, exposing large areas of the fruit to the direct rays of the sun. This results in considerable damage to the fruit and loss in recovery from sun-scald or sunburn of the fruit.

A further object of the invention is to provide a novel method for pineapple culture in which, through the use of synthetic hormones, the pineapple stem (peduncle) is strengthened, the fruit is kept erect, sun-scald is reduced, and the size and weight of the fruit are increased.

Another object of the invention is to effect a mechanical strengthening of the outer tissues of the fruit which are commonly referred to as the shell of the fruit. It is desirable to strengthen these tissues as a means of limiting bruising of the fruit in the harvesting operations and in the transportation and other handling of the fruit.

I have made the important discovery that the beneficial results which it is the object of this invention to produce can be obtained by application of synthetic hormones directly to the growing plant at proper times and in proper concentrations and quantities as will be hereinafter fully explained. By means of this discovery, I am enabled to bring about an increase in the weight of the pineapple fruit by as much as a pound or more per fruit while also correspondingly increasing its size and improving its quality. This amounts to an increase of eight tons or more fruit per acre. I also accomplish a delay in the maturation of the pineapple crop of as much as two months; an advance or delay, as desired, in the time of differentiation and flowering by a matter of weeks; and a strengthening of the peduncle.

In establishing the foregoing, numerous tests have been conducted on many plants and in different fields, the effects being checked by comparison with untreated plants in the same locality.

In an illustrative set of these tests, which will serve to illustrate the process as applied to the improvement of the fruit and peduncle, the plants treated had in all cases differentiated and were in various stages of development between differentiation and maturity of the fruit. The plant hormones employed were alpha naphthaleneacetic acid, potassium naphthalene acetate and alpha naphthylacetamide. The hormone was mixed in a liquid carrier consisting of water or of water and lanolin emulsion which was sprayed or poured over the hearts and leaves of the plants in approximately the quantity of 25 cc. to 100 cc. of mix to each plant. The concentrations of mix used were, in proportions of parts of hormone to parts of carrier 1:500, 1:1,000, 1:5,000, 1:10,000, 1:20,000, 1:33,500.

In all cases except where the fruit was substantially fully grown at the time of treatment, the following effects were produced.

1. Maturation and ripening of the fruit were delayed, from one week to two months, generally from two to three weeks.
2. The weight and size of the fruit were increased, the fruit of the treated plants being frequently more than a pound heavier than the fruit of the comparative untreated plants.
3. The quality of the fruit was improved.
4. The fruit of the treated plants had larger, more robust eyes than the fruit of the comparative untreated plants.
5. The peduncles of the treated plants were larger, stronger and more fibrous than those of the comparative untreated plants.

In the cases where the fruit was full grown at the time of treatment no significant effects were observed.

The effects were greatest and approximately the same with the hormone concentrations of from 1,000 to 33,500 parts carrier to one part of hormone applied at any stage of plant development between differentiation and half growth of the fruit.

Tests have shown that the effectiveness of a dry dusting powder mix for purposes of the present invention is about one-tenth that of the liquid mix at the same concentrations so that, if such a mix is employed, it should have about ten times the proportion of hormone to carrier of the liquid mixture.

Successive applications at spaced intervals sufficiently long to insure complete absorption by the plant of the hormone from the previous application, such as the intervals of last flower, one-quarter grown fruit, one-half grown fruit, etc., produced the same effects but to an enhanced degree as compared with the single application of corresponding hormone concentration. Successive applications at spaced intervals of only a few days produced the same effects but to an enhanced degree. Applications should be particularly directed onto the forming fruit.

I have also found that by applying synthetic hormones to the pineapple plants in advance of the normal date of differentiation, their differentiation and flowering may be retarded or advanced as desired according to the concentration of hormone employed, and the maturation date of the ensuing crop will be correspondingly retarded or advanced, provided hormone treatments are not applied during or after differentiation.

Thus, by applying synthetic hormones to the pineapple plants only in advance of differentiation in concentrations of one part hormone to from 1,000 to 10,000 parts of liquid carrier I have substantially delayed differentiation and flowering of the plants and also, correspondingly, maturation of the ensuing crop; whereas, if the hormones are applied to the plants in lesser concentration of one part hormone to from 16,500 to 200,000 parts of carrier, the opposite effects of precocious differentiation, flowering and corresponding advance of the date of crop maturation are produced. For the same effects, the concentrations of dry mixes should be about ten times that indicated for the liquid mixes. The mix is sprayed, poured or dusted onto the hearts and leaves of the plants. Suitable quantities are 25 cc. to 100 cc. liquid mix per plant.

Acceleration or retardation may be produced in this manner, varying from a few days to a matter of weeks, depending on how far in advance of the normal differentiation date the treatment is given. Within the concentration ranges mentioned, the higher concentrations produce more extensive changes than the weaker concentrations, though repeated applications of a weaker concentration mix may be employed to produce the same result as a single application in greater concentration.

This treatment has no substantial effect on the size and weight of the fruit or on its peduncle structure, merely changing its maturation date. For purposes of delaying crop maturation, therefore, the post-differentiation treatment previously described is more advantageous. However, by advancing the crop maturation date of some only of the plants by such pre-differentiation treatment, the grower may attain a definite prolongation of his harvesting periods and reduction of peak loads, particularly if he also delays maturation of some only of his plants either by post-differentiation or pre-differentiation treatment as previously described. Also, pre-differentiation treatment which accelerates differentiation may be employed to offset in whole or in part a delay in crop maturation resulting from post-differentiation treatment of the same plants; and, conversely, if the plants are given a pre-differentiation treatment which retards their differentiation and are then given the post-differentiation treatment, the delay of their crop maturation date beyond the normal date is greater than that which would result from either treatment alone.

The hormone treatments may be applied to pineapple plants after the first crop; that is, in the ratoon crop stage, as well as before the first crop, with like benefits. The fruit bearing suckers of plants in the ratoon stage generally develop unequally, some being much further matured than others at any given time. Such plants may be treated with hormone, in concentrations previously mentioned as suitable for post-differentiation treatment to increase crop size, at a time when some of the suckers have passed the differentiation stage and others have not. This treatment will produce different effects on individual suckers according to their stage of development, delaying maturation and improving the crop of the suckers which have passed differentiation and, as these concentrations are within the range of concentrations suitable for producing precocious differentiation, accelerating differentiation of the other suckers.

In the practice of the invention, I prefer to apply the hormone in a liquid carrier which may suitably be water or a water and lanoline or a water and oil emulsion or a solvent such as alcohol or the like. If a dry powder is used as a carrier, talc, clay, bentonite, kaolin and the like are suitable. The mixture is sprayed, poured or dusted on the plants, care being taken to insure direction of a substantial quanity into the hearts of the plants. Beta naphthoxy acetic acid, alpha naphthaleneacetic acid and alpha naphthylacetamide are considered preferred hormones for purposes of the invention because they are efficient and comparatively inexpensive and easily obtainable, but other hormones may, of course, be used with like effect as previously noted. A single hormone may be used, or several may be used in combination.

Having now described and explained preferred practices of the invention, what I desire to claim and secure by Letters Patent is:

1. A method for producing delayed differentiation of pineapple plants which comprises applying to the hearts and leaves of the plants prior to differentiation a mixture of a plant hormone and a liquid carrier medium therefor, the hormone concentration of said mixture being in excess of one part of hormone to 10,000 parts of liquid medium.

2. A method for the culture of pineapple plants which comprises applying to the plants, prior to differentiation, a composition including a plant hormone suspended in a liquid carrier medium, the hormone concentration of said composition being in excess of one part of hormone to 10,000 parts of liquid medium.

3. A method for producing delayed differentiation of pineapple plants which comprises applying to the hearts and leaves of the plants prior to differentiation a mixture of a plant hormone and a liquid carrier medium therefor, the hormone concentration of said mixture being in excess of 1 part of hormone to 10,000 parts of liquid medium, said hormone being selected from the group consisting of alpha naphthaleneacetic, beta naphthoxy acetic, indoleacetic, indolebutyric acids, and amides and alkali metal salts thereof.

4. A method for producing delayed differentiation of pineapple plants which comprises applying to the plants prior to differentiation a mixture of a plant hormone and a liquid carrier medium therefor, the hormone concentration of said mixture being 1 part of hormone to from 1,000 to 10,000 parts of liquid medium.

FERDINAND P. MEHRLICH.

REFERENCES CITED

The following references are of record in the file of this patent:

UNITED STATES PATENTS

| Number | Name | Date |
|---|---|---|
| 2,258,291 | Jones | Oct. 7, 1941 |
| 2,258,292 | Jones | Oct. 7, 1941 |
| 2,284,002 | Lontz | May 26, 1942 |

OTHER REFERENCES

Crocker: "Similarities in the Effects of Ethylene and the Plant Auxins." Contrib. Boyce Thompson Inst., vol. 7, pp. 231–248 (1935).

Killeffer: "Plant Hormones." Ind. Eng. Chem., News Ed., vol. 18, pp. 395–399 (May 10, 1940).

Traub: "Inducing Flowering in the Pineapple." Proc. Am. Soc. Hort. Sci., vol. 37, pp 521–525 (1940).

Zimmerman: "Formative Effects Induced with Beta-Naphthoxyacetic Acid" Contrib. Boyce Thompson Inst., vol. 12, pp. 1–14 (March 18, 1941).

Clark: "Control of Flowering with Phytohormones." Science, vol. 95, pp. 536–537 (May 22, 1942).

Cooper: "Effect of Growth Substances on Flowering of the Pineapple" Proc. Am. Soc. Hort. Sci., vol 41, pp 93–98 (Sept. 1942).